United States Patent [19]

Oda

[11] Patent Number: 4,761,340

[45] Date of Patent: Aug. 2, 1988

[54] CERAMICS SLIDING MEMBER

[75] Inventor: Isao Oda, Nagoya, Japan

[73] Assignee: NGK Insulators, Ltd., Japan

[21] Appl. No.: 883,332

[22] Filed: Jul. 8, 1986

[30] Foreign Application Priority Data

Jul. 12, 1985 [JP] Japan .................................. 60-152551

[51] Int. Cl.[4] ............................................. B32B 15/04
[52] U.S. Cl. .................................... 428/457; 428/698; 428/699
[58] Field of Search ...................... 428/457, 698, 699; 501/97

[56] References Cited

FOREIGN PATENT DOCUMENTS

0051300 5/1982 European Pat. Off. ........ 428/457 X
1297869 11/1972 United Kingdom ........... 428/698 X
1343930 1/1974 United Kingdom ........... 428/698 X

OTHER PUBLICATIONS

Dworak et al., "Ceramic Components for Combustion Engines", 1141 Ingenieurs de l'Automobile (1983), Nov.-Dec., No. 8, Paris, France.
"Alternative Werkstoffe fur Automobilantriebe"; 46 (1985) Mai, No. 5, Stuttgart, Deutschland.

*Primary Examiner*—Thomas J. Herbert
*Attorney, Agent, or Firm*—Parkhurst & Oliff

[57] ABSTRACT

The disclosed ceramic sliding member has one sliding plane formed by ceramic member and the other sliding plane made of a metal member coated with a composition of Cu and LiF to which the ceramic sliding plane is faced, and possesses small weight loss and low max wear depth on a friction and wear test. Therefore, it is preferable use the ceramic sliding member in applications such as tappet/cam, rocker arm/cam, valve/valve seat and linear/piston ring.

6 Claims, 4 Drawing Sheets

CERAMICS SLIDING MEMBER

BACKGROUND OF THE INVENTION

1. Field of the Invention

This invention relates to a sliding member using a ceramics member.

Throughout this specification, a term "sliding member" includes a contact member such as valve and valve seat and a rolling member such as roller bearing. Also, a term "coating" includes a partial coating and especially includes a coating with a composition of Cu and LiF for only depressions formed on a surface of a metal member.

2. Related Art Statement

Heretofore, as for a sliding member for use in engine members, use is made of a metal material such as a heat-resistant alloy with a lubricant such as oil, because the engine members are exposed to high temperatures and also to wear due to high speed revolutions.

However, since the sliding member is used continually year after year there is an increase in the wear of the sliding member. There occurs a requirement for utilizing the sliding members without lubricant, thus causing a drawback where requirements concerning temperature and wear cannot be achieved by the metal material or that the metal member must be frequently changed.

In order to eliminate the drawbacks mentioned above, a ceramic material may be used for the sliding member. The ceramic material can endure high temperature and has high wear resistivity and high heat efficiency, but is very hard and brittle. Therefore, all the ceramic materials cannot be used for the sliding member for this purpose.

Heretofore, there has been no investigation about what ceramic material is preferable for the sliding member especially for the engine member which endures high temperatures and requires high wear resistivity, and further about what other preferable sliding member is to be brought into contact with the ceramic material.

SUMMARY OF THE INVENTION

The object of the present invention is to eliminate the drawbacks mentioned above and to provide a ceramic sliding member preferably used for an engine member which has a good combination between the ceramic member and the other member to be brought into contact with the ceramic member without using a lubricant.

According to the invention, a ceramic sliding member comprises one sliding plane formed by ceramic member and another sliding plane made of a metal member coated with a composition of Cu and LiF, to which said ceramics sliding plane is faced.

This invention finds that sliding ceramic materials such as silicon nitride, sialon, partially stabilized zirconia or silicon carbide against a metal member, especially against a metal member whose sliding surface is coated with a composition of Cu and LiF by means of a plasma spray, can achieve high wear resistivity at any temperature ranging from room temperature up to high temperatures.

Moreover, a sliding of ceramic materials against other ceramic materials cannot achieve high wear resistivity.

DESCRIPTION OF THE PREFERRED EMBODIMENTS

Figure 1:
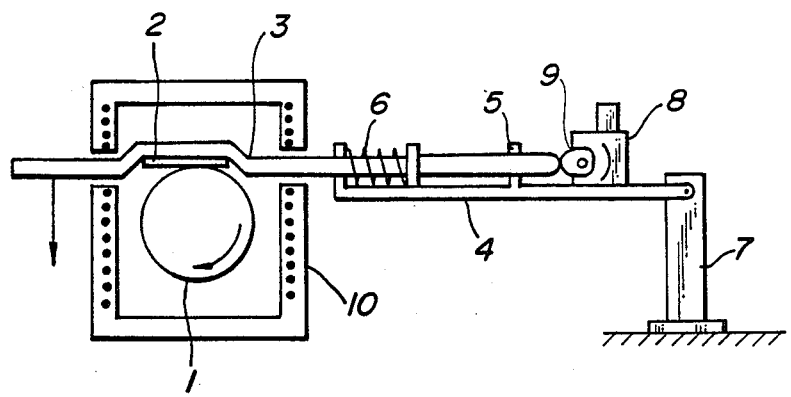
FIG. 1 is a schematic view showing one embodiment of a test apparatus for measuring a sliding characteristics.
Figure 2:
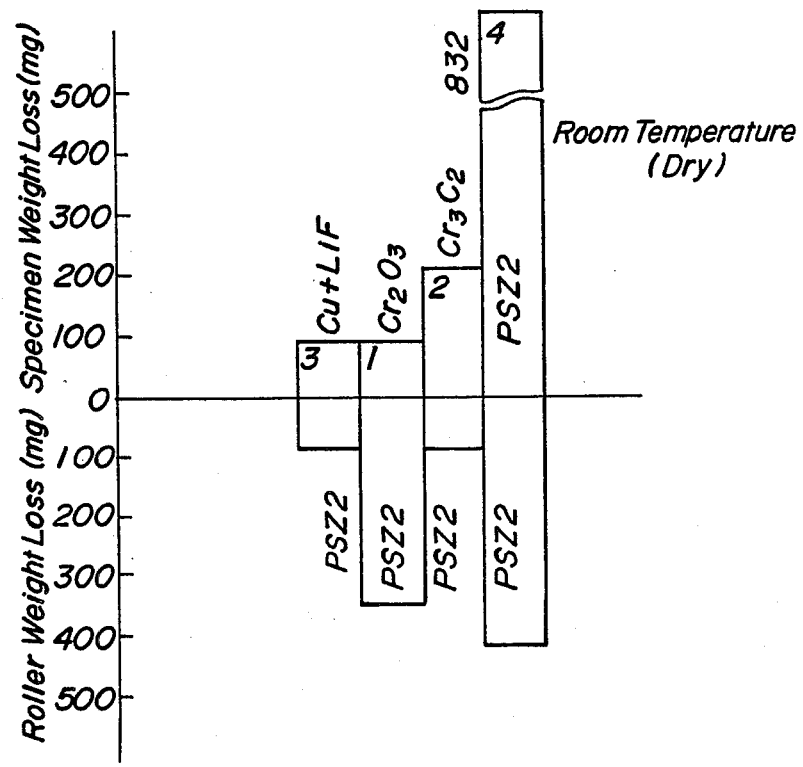
FIGS. 2 to 5 are schematic views illustrating testing results of specimens.
Figure 3:
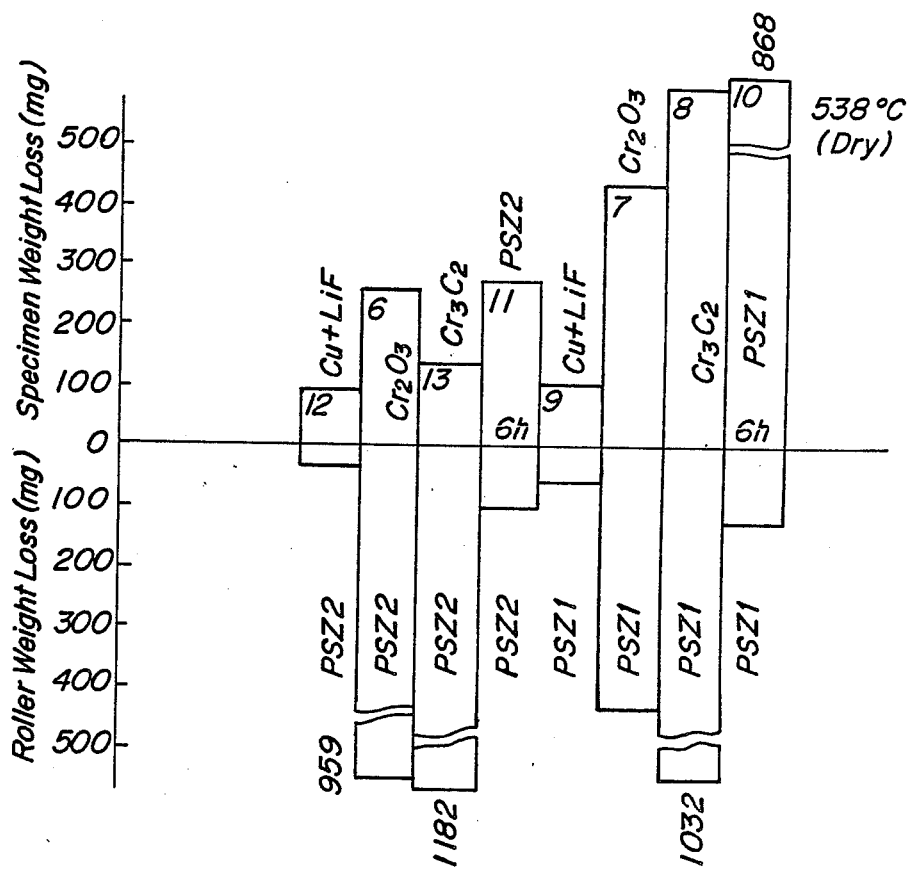
Figure 4:
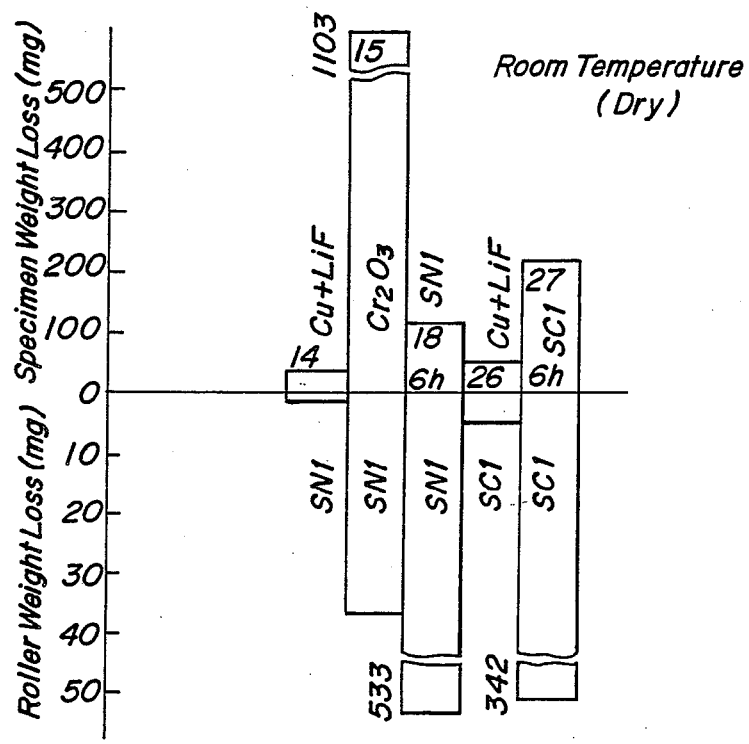
Figure 5:
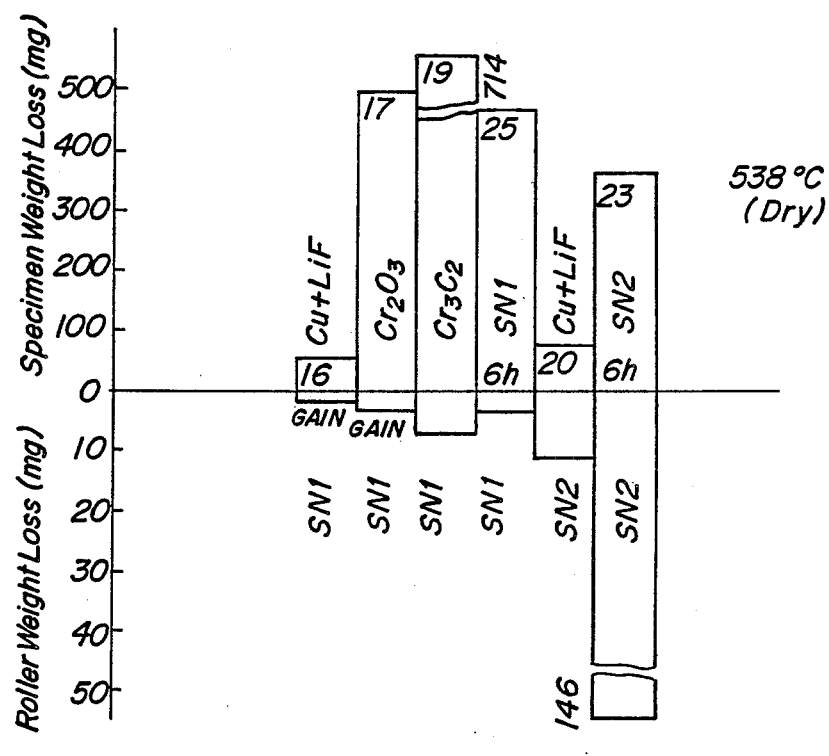

FIG. 1 is a schematic view showing one embodiment of a test apparatus for measuring sliding characteristics such as friction and wear. In this embodiment, one specimen made of a ceramic material is set to the test apparatus as a counterface roller 1 having a diameter of 50 mm. The ceramic counter roller 1 is rotated at 1,000 rpm by means of a driving device not shown. As for the other specimen, a test specimen 2 made of for example metal material coated with Cu+LiF and having a shape of 40 mm×6.33 mm×3 mm is also set to the test apparatus in such a manner that it is brought into contact with the counter roller 1 by means of a loading arm 3 as shown in FIG. 1. One end of the loading arm 3 is secured to a support member 4 through a linear/rotary bearing 5 and a spring 6, and the support member 4 is moved pivotally by means of a pivot bracket 7. Moreover, on the support member 4, a tip portion of the loading arm 3 is brought into contact with a cam 9 connected to a motor 8 rotating at 3 rpm, and thus the loading arm 3 is moved forward and backward with a stroke of 12 mm at three times per a minute. Further, a force of 20N is loaded at the other end of the loading arm 3 downwardly, and thus the ceramic counter roller 1 is brought into contact with the test specimen 2 at a constant pressure. Furthermore, the ceramic counter roller 1 and the test specimen 2 are surrounded by an insulated oven 10 so as to perform the test under high temperature.

By using the test apparatus mentioned above, a weight loss and a maximum wear depth between various ceramic materials and metals or ceramic materials are measured. The materials used for the specimen are shown in table 1 together with their forming process. In table 1, a coating layer is formed by the plasma spray. Moreover, in a high-speed tool steel coated with Cu+LiF, spherical depressions each having a diameter of 390 μm and a depth of 100 μm are formed at an interval of 460 μm to a surface to be coated by means of an etching before a coating operation with Cu+LiF.

TABLE 1

| Specimen No. | Process Details |
|---|---|
| $Cr_2O_3$ | 316 stainless steel plate 3 mm thick, grit blasted both sides, plasma spray one side bond coat of NiAL (100 micron) plus chromium oxide (150–200 microns) diamond lap to 75 microns of chrome oxide Ra = 4–8 micron-in. |
| $Cr_3C_2$ | 316 stainless steel plate 3 mm thick, grit blasted both sides, plasma spray one side Metco 815 (75% $Cr_3C_2$ 20% Ni 5% Cr) (300 microns) diamond lap to (175 microns) Ra = 4–8 micron-in. |
| Cu + LiF | M2 hardened and tempered 65 Rc, surface ground, polished and diamond polished. Surface pockets etched one side. Light grit blast. Plasma spray Cu + LiF (200–250 microns), grind on abrasive papers to (100–125 microns) Ra = 16 micro-in. |
| SN1 | Atmospheric sintered silicon nitride, hardness 15 GPa, density 3.27 |
| SN2 | Atmospheric sintered sialon, |

TABLE 1-continued

| Specimen No. | Process Details |
|---|---|
| | hardness 14 GPa, density 3.25 |
| PSZ1 | Atmospheric sintered partially stabilized zirconia with $Y_2O_3$, hardness 12 GPa, density 5.91 |
| PSZ2 | Atmospheric sintered partially stabilized zirconia with $Y_2O_3$ + $ClO_2$ hardness 13 GPa, density 5.98 |
| SC1 | Atmospheric sintered silicon carbide, hardness 28 GPa, density 3.10 |

For all the specimens described in table 1, a friction and wear test is performed at room temperature and at 538° C. without using the lubricant to measure a weight loss and a max wear depth. The test at 538° C. is performed for a purpose such that the specimen is supposed to use for a piston in a cylinder. The results are shown in the following table 2. Further, for the simplicity of understanding, the results described in table 2 are summarized in FIGS. 2 to 5. Here, numerals in table 2 correspond to those of test numbers.

TABLE 2(a)

| Test No. | Specimen | Roller | Test duration (hour) | Test temperature (°C.) | Specimen weight loss (g) | Specimen max wear depth (in) | Roller weight loss (g) | Roller max wear depth (microns) |
|---|---|---|---|---|---|---|---|---|
| 1 | $Cr_2O_3$ | PSZ2 | 18 | R.T. | 0.084 | 0.0071 | 0.358 | 82 |
| 2 | $Cr_3C_2$ | PSZ2 | 18 | R.T. | 0.204 | 0.0227 | 0.089 | 28 |
| 3 | Cu + LiF | PSZ2 | 18 | R.T. | 0.081 | 0.007 | 0.094 | 46 |
| 4 | PSZ2 | PSZ2 | 18 | R.T. | 0.832 | 0.0613 | 0.421 | 63 |
| 5 | | PSZ2 | | Roller damaged on heating up | | | | |
| 6 | $Cr_2O_3$ | PSZ2*[1] | 18 | 538 | 0.256 | 0.023 | 0.9595 | 189 |
| 7 | $Cr_2O_3$ | PSZ1 | 18 | 538 | 0.422 | 0.0353 | 0.446 | 158 |
| 8 | $Cr_3C_2$ | PSZ1 | 18 | 538 | 0.5815 | 0.063 | 1.032 | high |
| 9 | Cu + LiF | PSZ1 | 18 | 538 | 0.0925 | 0.0077 | 0.062 | 14 |
| 10 | PSZ1 | PSZ1 | 6 | 538 | 0.868 | 0.0673 | 0.137*[3] | 12 |
| 11 | PSZ2 | PSZ2 | 6 | 538 | 0.268 | 0.022 | 0.102 | 21 |
| 12 | Cu + LiF | PSZ2 | 18 | 538 | 0.088 | 0.008 | 0.027 | 8 |
| 13 | $Cr_3C_2$ | PSZ2 | 18 | 538 | 0.131 | 0.0138 | 1.182 | 243 |
| 14 | Cu + LiF | SN1 | 18 | R.T. | 0.035 | 0.0035 | 0.001 | <5 |
| 15 | $Cr_2O_3$ | SN1 | 18 | R.T. | 1.1035 | 0.0632 | 0.037 | 23 |
| 16 | Cu + LiF | SN1 | 18 | 538 | 0.0565 | 0.0043 | +0.002 | <5 |
| 17 | $Cr_2O_3$ | SN1 | 18 | 538 | 0.493 | 0.038 | +0.004 | <5 |

TABLE 2(b)

| Test No. | Specimen | Roller | Test duration (hour) | Test temperature (°C.) | Specimen weight loss (g) | Specimen max wear depth (in) | Roller weight loss (g) | Roller max wear depth (microns) |
|---|---|---|---|---|---|---|---|---|
| 18 | SN1 | SN1 | 6 | R.T. | 0.110 | 0.0203 | 0.533 | 254 |
| 19 | $Cr_3C_2$ | SN1 | 18 | 538 | 0.7145 | 0.053 | 0.007 | <5 |
| 20 | Cu + LiF | SN2 | 18 | 538 | 0.0765 | 0.0055 | 0.011 | <5 |
| 21 | $Cr_2O_3$ | SN2 | 2.5*[2] | 538 | 0.017 | 0.002 | +0.012 | — |
| | | | 5.5*[2] | 538 | 0.017 | 0.002 | +0.012 | <5 |
| 22 | $Cr_3C_2$ | SN2 | 2.5*[2] | 538 | 0.025 | 0.0025 | 0.000 | — |
| | | | 5.5*[2] | 538 | 0.0545 | 0.0055 | 0.000 | <5 |
| 23 | SN2 | SN2 | 6 | 538 | 0.3705 | 0.0562 | 0.146 | 117 |
| 24 | $Cr_3C_2$ | SN1 | 2.5*[2] | R.T. | 0.029 | 0.0033 | 0.024 | — |
| | | | 5.5*[2] | R.T. | 0.070 | 0.0088 | 0.021 | 7 |
| 25 | SN1 | SN1 | 6 | 538 | 0.464 | 0.058 | 0.039 | 25 |
| 26 | Cu + LiF | SC1 | 18 | R.T. | 0.053 | 0.0041 | 0.005 | <4 |
| 27 | SC1 | SC1 | 6 | R.T. | 0.223 | 0.0168 | 0.342 | 172 |

*[1]Roller damaged on cooling down
*[2]Special test-test load 2.25 lbs (standard load = 5 lbs)
*[3]Indicates weight increase (not weight loss)

As described above, the weight loss and the maximum wear depth between the specimen of a high-speed tool steel (M2) whose surface is coated with Cu+LiF and various ceramics materials are always the smallest regardless of the test temperatures. Therefore, the combinations of the high-speed tool steel coated with Cu+LiF and various ceramics materials are assumed to be best for the ceramics sliding member. Contrary to this a combination of 316 stainless steel whose surface is coated with $Cr_2O_3$ or $Cr_3C_2$ and various ceramics materials generally shows, a large weight loss, and thus is not preferred for the ceramics sliding member. Further, a combination of ceramics materials and ceramics materials also shows a large weight loss, and thus it is not preferable for the ceramics sliding member.

As clearly understood from the above, combinations of the metal materials whose surfaces are coated with Cu+LiF and various ceramics materials are preferred for the ceramic sliding member because the weight loss and the max wear depth are small in regardless of the test temperatures.

What is claimed is:

1. A ceramic sliding member comprising:
   a first sliding plane formed by a silicon nitride ceramic member; and
   a second sliding plane in contact with said first sliding plane, said second sliding plane being formed by a metallic member, said metallic member having depressions formed thereon, said second sliding plane being coated, at least in said depressions, with a composition of Cu and LiF.

2. A ceramic sliding member according to claim 1, wherein said metal member is made of a high-speed tool steel.

3. A ceramic sliding member according to claim 1, wherein said sliding member is used for an engine member.

4. A ceramic sliding member according to claim 1, wherein said sliding member is used for a tappet and a cam or for a rocker arm and a cam.

5. A ceramic sliding member according to claim 1, wherein said sliding member is used for a valve and a valve seat.

6. A ceramic sliding member according to claim 1, wherein said sliding member is used for a liner and a piston ring.

* * * * *